Figure 2:
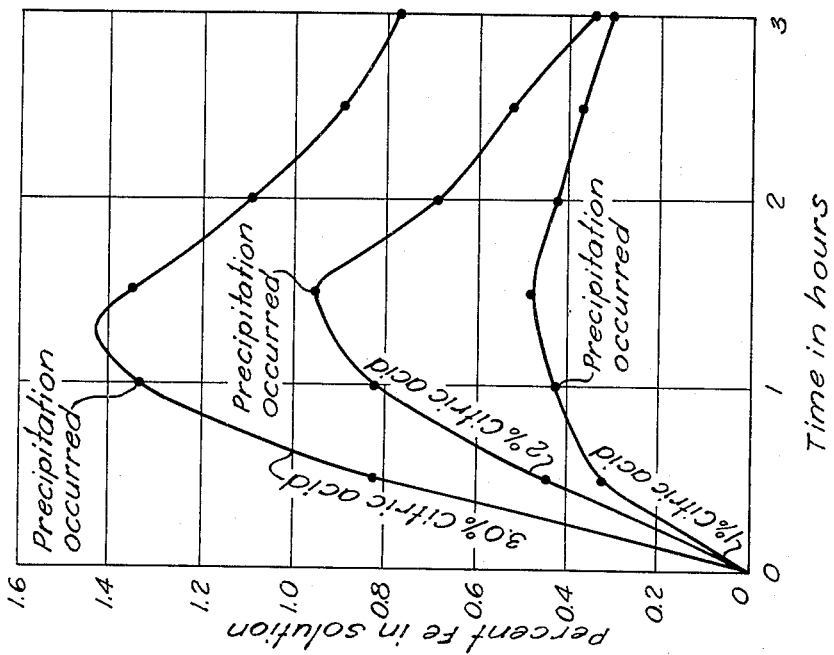

Oct. 10, 1961   C. F. REICH   3,003,898
SCALE REMOVAL

Filed Aug. 10, 1960   2 Sheets-Sheet 1

INVENTOR.
Cecil F. Reich
BY
CW Carlin
ATTORNEY

Oct. 10, 1961 — C. F. REICH — 3,003,898
SCALE REMOVAL
Filed Aug. 10, 1960 — 2 Sheets-Sheet 2

INVENTOR.
Cecil F. Reich
BY
C. W. Carlin
ATTORNEY

United States Patent Office 3,003,898
Patented Oct. 10, 1961

3,003,898
SCALE REMOVAL
Cecil F. Reich, Tulsa, Okla., assignor to The Dow Chemical Company, Midland, Mich., a corporation of Delaware
Filed Aug. 10, 1960, Ser. No. 48,630
7 Claims. (Cl. 134—22)

The invention is directed toward the removal of scale and foreign matter of a tenacious character from the interior surfaces of vessels of the type employed for storage, transfer, or circulation of fluids, e.g. boiler and heat exchanger tubes, transfer lines, and storage tanks. It is particularly directed toward the removal of scale and difficultly removable adhering foreign matter from the interior of tubes in superheaters and supercritical steam generators that employ tubes therein which have non-drainable sections due to U-shaped or hairpin bends and, when cleaned by conventional cleaning methods, usually, are required to be dismantled and each tube individually treated for satisfactory removal of adhering scale therefrom.

Scale forms on iron and steel surfaces during fabrication and periods of disuse. When such surface is the interior of a closed or partially closed vessel, the removal of such scale is a particularly difficult problem. It is particularly difficult in sinuous or serpentine pipes and coils.

Vessels are often used to convey, circulate, store, or otherwise confine fluids which contain impurities, dissolved or suspended therein, which are corrosive to the interior of the walls of the confining vessel or encourage the formation, accumulation, or deposition thereon of scale or other adherent materials. Fluids, commonly extensively confined, transferred, or circulated in vessels are waters containing foreign substances. Most waters, even though especially treated, as, e.g. for boiler use, contain corrosive materials suspended and/or dissolved therein which are instrumental in forming a hard adherent substance on the walls of the vessels contacted by such water. The term, scale, as used herein, includes any compact tenaciously-adhering material on the walls of a vessel, such scale being composed of a variety of materials including chemical compounds such as $Fe_3O_4$, $CaCO_3$, and a large number of slightly soluble or insoluble chemical compounds, microscopic plant and animal growths, and particles of sand, mud, and hydrocarbonaceous substances. The term, scale, as used herein, not only includes hard materials but soft adhering foreign material formed on the interior of vessels, both during disuse and during transfer or storage of fluids.

Scale deposition on the surfaces of vessels is undesirable for a number of reasons, e.g. it hinders the flow of fluid therethrough, thermally insulates and hinders the conduction of heat through the walls of the vessel, increases the consumption of fuel, requires high pressures to force fluids therethrough and, in subjecting the metal composing the vessels to high temperatures, results in increased cost of operation, damage to tubes, plates, and other sections of said vessel, and usually causes leaks or a complete failure of the vessel.

The removal of scale and adhering foreign material from the interior of coils and pipes and other vessels by the use of such solvents as hydrochloric acid cannot be practiced in a number of instances. Non-stainless steel vessels present serious corrosion problems when subjected to conventional cleaning compositions. Stainless steel coils and pipes are subject to chloride cracking when contacted with chloride-containing solvents. Non-drainable sections of coils and tubes present particularly serious trouble because conventional solvents cannot be satisfactorily employed to remove the adhering scale and foreign material from such non-drainable sections because most of such solvents manifest some corrosive property when left in contact with iron or steel for a protracted period of time. Inhibitors used to lessen or prevent the corrosivity of scale-removing acidic materials are usually dissipated or rendered relatively ineffective after a period of time and the corrosivity of the solvent then becomes noticeable and, as a result thereof, the metal composing the walls of the vessel is thereafter subjected for an appreciable period to such corrosivity. Attempts to remove residual treating solvents from hairpin bends and the like by flushing and blowing operations are only partially satisfactory and at best entail considerable extra cost and inconvenience.

Some solvents for adhering scale and foreign matter on the interior of vessels, which may be removed from non-drainable sections of tubes and coils by merely subjecting them to heat and thereby volatilizing the solvent, are known. However, such known solvents often have a lower solubility for the scale sought to be removed than is desirable. Furthermore, in operations requiring the removal of relatively thick scale or the removal from relatively long tubes, coils, and the like, or from large surface areas generally, the solvent becomes saturated with the dislodged scale and foreign material and a precipitate thereafter forms as a sludge and accumulates in the vessel sought to be cleaned.

A need, therefore, exists for an improved method of removing scale and foreign material from the surfaces of vessels, both during disuse and during use wherein they are contacted by scale-forming fluids, including both gases and liquids, using a solvent which is relatively non-corrosive, may be volatilized therefrom, has a high solubility for the scale or foreign material being removed from the walls of the vessel, e.g., circulating pipes, connecting lines, circuitous winding, or convoluted coils, pipes, and the like, and which may be employed for descaling and cleaning metal surfaces without objectionable precipitate or sludge being formed during the cleaning operation.

The invention is predicated on the discovery that a synergistic effect on scale and other adhesive foreign matter is obtained when such scale or adherent matter is contacted by an aqueous solution comprising both formic acid and citric acid with a specified proportion of each (as set out hereinafter), such effect manifesting itself largely by there being no precipitate or sludge formed.

The invention accordingly, is a method of removing scale and adhering foreign material from the interior surface of walls of a vessel employing an aqueous solution comprising effective amounts of both formic acid and citric acid. The composition usually includes an inhibitor to the corrosivity of acids on metal and a surfactant. The invention is carried out by admixing both citric and formic acid within the range of the amounts of each hereinafter set forth (with or without a surfactant and/or inhibitor to the corrosivity of an acid to a metal) with water and contacting the scale-coated surfaces of a vessel to be treated with the solution so prepared. Such contact may be effected by any known means, usually consisting, however, of pumping the solution into the vessel, e.g. a pipe, coil, or tank, allowing it to remain therein until a substantial portion of the scale has been dissolved, and pumping the solution containing the dissolved scale out of the vessel. A continuous pumping arrangement may be employed. Best results are obtained when the formic-citric acid solution is employed at a temperature of at least about 150° F. and preferably between about 200° and the boiling point of the solution. Two hours is usually enough time to dissolve tenaciously adhering scale although less or longer times are frequently employed. In descaling or cleaning coils having sharp bends and turns, it is customary in the practice of the invention to heat the coils following dissolution of the scale, to a temperature above the decomposition temperatures of citric and formic acids, e.g. about 320° F.

When either formic acid or citric acid, but not both, is used (with or without a surfactant or with or without an inhibitor to the corrosivity of an acid) to remove scale or adhering foreign material from the surface of a vessel, the results are not fully satisfactory because, the concentration of the dissolved material formed by the dissolution of the scale by either the formic or the citric acid usually reaches the point of saturation before the scale has been fully dissolved (unless the scale to be removed is relatively small in amount) and a precipitate forms and settles out as a sludge. The precipitate is thought to be a hydrated ferric oxide when formic acid is employed and iron citrates when citric acid is employed. In either instance, the sludge formed is exceedingly resistant to removal. As a concomitant undesirable effect to the formation of a precipitate when employing either one of these acids alone as the effective solvent in a descaling or cleaning operation, there is usually inadequate iron oxide pick-up and as a result, the scale is not fully dissolved and cannot be satisfactorily removed. Even in treating small units this problem is troublesome, and, in attempting to treat larger units with either formic or citric acid alone, the problem becomes particularly acute. When such larger units are to be so cleaned, several hours are often required to fill the vessel completely and remove all the solvent. It is often necessary according to known practices, therefore, to drain the spent solvent containing dissolved scale from the unit before the unit has been cleaned completely in order to avoid precipitation and, thereafter, repeat the operation, often a number of times, in order to descale and clean the vessel in a satisfactory manner.

The descaling composition or solvent employed in the process of the invention is an aqueous solution containing minimum amounts of both citric acid and formic acid within specified proportions of each. The relative proportions of the two acids may vary between 1 and 6 parts by weight of citric acid to between 3 and 1 part by weight of formic acid or, stated in percent by weight of the resulting mixture, between 25 and about 86 percent citric acid and balance formic acid. When proportions outside of these limits are employed, a precipitate tends to form and lessens the effectiveness of the process. The percent of combined weights of both acids in the aqueous solution may vary from 0.2 to 20 percent of the weight of the aqueous solution but is usually from 0.5 to 3 percent thereof.

Although the corrosivity of the solution employed in the practice of the invention is less than most known acidic cleaning solutions, an inhibitor to the corrosivity of acids to metals may be employed. It may be any of the known acid inhibitors, among which are (1) the organic reaction product, described in U.S. Patent 2,403,153, formed by heating to effect chemical interaction among the following reactants: (a) an organic chloride chosen from the group consisting of ethylene dichloride, propylene dichloride, dichloroethyl ether, dichloroisopropyl ether, triglycol dichloride, tetraglycol dichloride, benzyl chcloride, and naphthyl methyl chloride, (b) a cyclic coal-tar base, and (c) a substance chosen from the group consisting of water-soluble inorganic thiocyanates and thiourea, the proportions of said reactants being chosen so that approximately 1 gram atom of basic nitrogen is added in the form of the said coal-tar base, and approximately 1 gram equivalent in the aggregate of the groups of thiocyanate and thiourea is added in the form of a substance chosen from said group of water-soluble inorganic thiocyanates and thiourea, for each gram atom of chlorine added in the form of said organic chloride; (2) organic nitrogen base inhibitors such as those listed in Table I of U.S. Patent 2,606,873, preferably together with an aldehyde and a wetting agent as described therein; (3) glycol ethers of an ethanol amine as described in U.S. Patent 2,510,063; (4) the reaction products of a rosin amine, formaldehyde, and a ketone as described in U.S. Patent 2,758,970.

The wetting agent may be any of a number of agents which effect a wetting of the scale and walls of the vessel to be cleaned by the aqueous cleaning solvent employed. The condensation product produced by condensing ethylene oxide with di-secondary butylphenol in a proportion of about 10 moles of ethylene oxide to 1 mole of the di-secondary butylphenol is particularly effective since it has also an inhibiting effect on corrosivity and is therefore supplemental to the inhibitor employed. Said condensation product is hereinafter referred to as wetting agent "W" for simplicity.

To show the effectiveness of the composition of the invention containing satisfactory amounts of formic acid, citric acid, a surfactant or wetting agent, and an inhibitor to corrosion, to dissolve $Fe_3O_4$-containing scale without the formation of a sludge-like precipitate (as soon as the iron content of the acid solvent has been substantially increased as is unavoidable when either citric or formic acid is used as the solvent), the following comparative runs and examples of the invention were carried out as follows:

A section of a vertically-positioned 1¾" inside diameter carbon steel tubing, the inner wall of which was heavily coated with mill scale (largely $Fe_3O_4$), was fitted at the bottom end with a rubber stopper having a tubing inserted thereinto leading from the steel tubing and at the upper end with a reflux condenser. The exposed area on the inner surface of the 1¾" tubing was 36 square inches. A ½" diameter carbon steel tubing, of shorter length than the 1¾" diameter carbon steel tubing and having both inner and outer surfaces thereof covered with a heavy coating of mill scale, was placed in the 1¾" diameter tubing. The ½" diameter tubing was of such length that the total area of the inner and outer surfaces thereof was 24 square inches. It was open at both ends so that a fluid passing through the 1¾" diameter tubing would readily contact both the inner and outer surfaces of the ½" diameter tubing as well as the inner surface of the 1¾" tubing. 200 milliliters of an aqueous solution selected from either formic acid or citric acid in the comparative runs or a mixture thereof in the examples of the invention were then poured into the 1¾" tubing. There was, thereby, completely covered the 24 square inches exposed on both surfaces of the ½" tubing and the 36 square inch exposed inner surface of the 1¾" tubing; the total area of mill scale of both tubes thus in contact with the solvent was 60 square inches. The solvent in the tubing was brought to a boil for a measured period of time.

The amount of solvent selected in proportion to the scale was calculated (for test purposes) so as to provide an insufficient amount to dissolve all the scale, i.e. there was always an excess of scale present over that which the amount of acid could dissolve, but in excess of that required to form a sludge as would have occurred had either formic acid or citric acid been employed singly.

The composition employed in the examples of the invention was prepared as follows: 0.2 percent of the organic inhibitor to corrosion, described in U.S. Patent 2,403,153 (referred to hereinabove), 0.075 percent of wetting agent "W" (described hereinabove), and a mixture of both citric acid and formic acid in the amounts hereinafter stated were dissolved in water.

The composition employed in the comparative runs was the same as that employed in the examples of the invention except that either citric acid or formic acid was employed, but not both.

Figure 1:
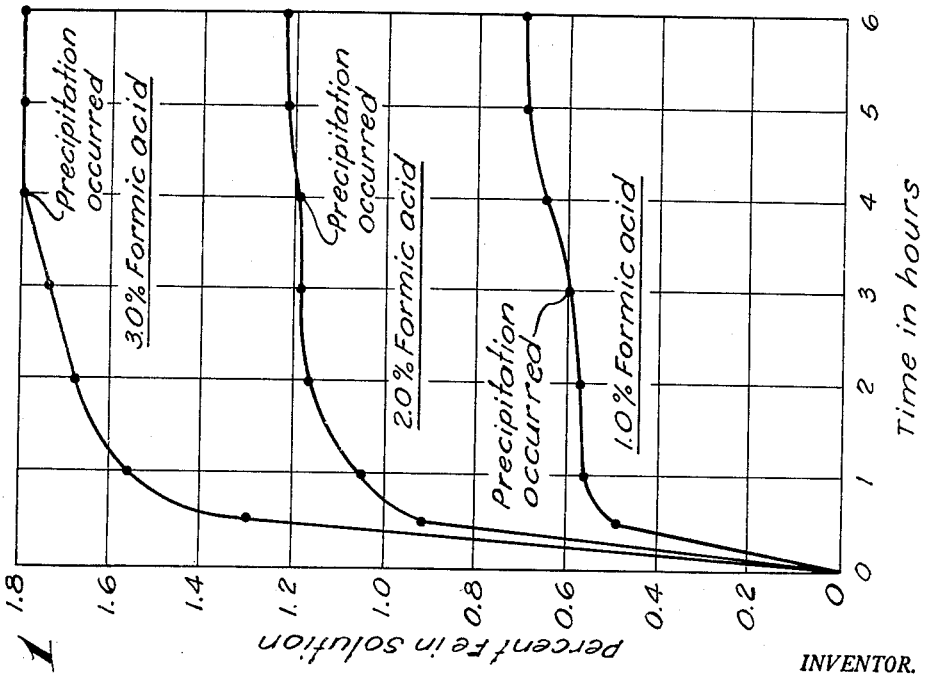
Figure 4:
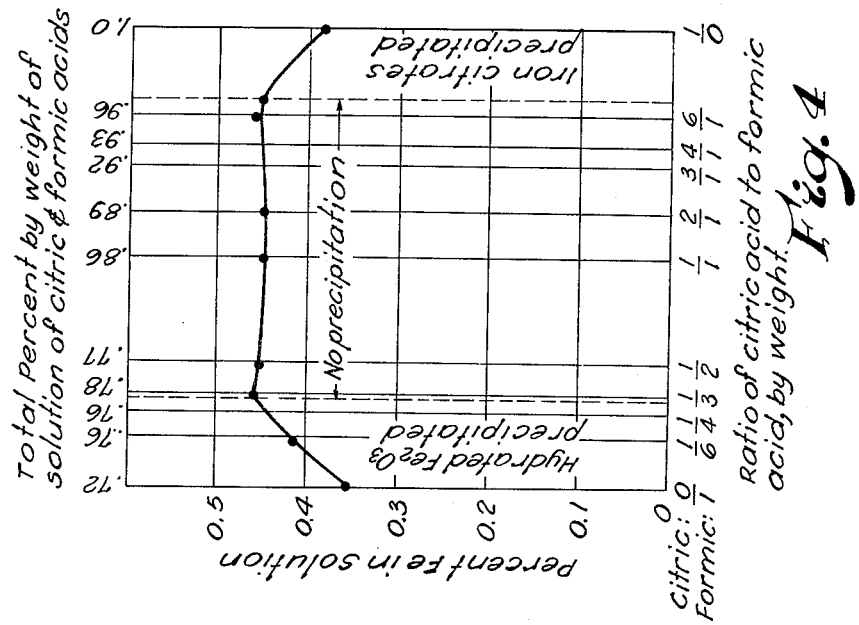
Figure 3:
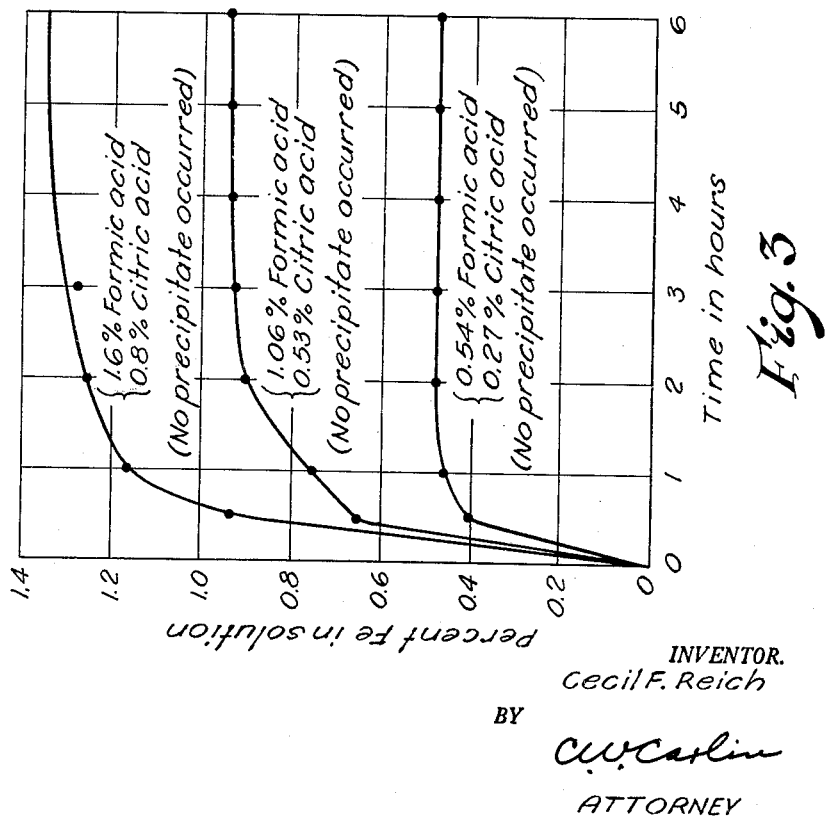

FIGURES 1 and 2 of the drawing show graphically the results obtained when employing either citric acid or formic acid but not both acids. FIGURES 3 and 4 of the drawing show graphically the results obtained when employing both citric and formic acid together.

In FIGURES 1-3 of the drawing, there is shown on the vertical axis the percent Fe dissolved by the action of the aqueous acidic solvent composition, prepared as described above, and, on the horizontal axis the time in hours during which the solvent composition was in contact with the scale. The percent concentration of the acid in the aqueous composition and the point at which precipitation occurred (if any) is stated on each curve of the figures. FIGURE 1 shows the results obtained from three series of comparative runs, each series consisting of seven treatments wherein $Fe_3O_4$-containing scale was contacted by 1, 2, and 3 percent strength aqueous formic acid solutions. FIGURE 2 shows the results obtained from three series of comparative runs of six treatments each wherein $Fe_3O_4$-containing scale was contacted with 1, 2, and 3 percent citric acid solution. FIGURE 3 shows the results obtained from three series of runs of seven treatments each in accordance with the invention wherein the $Fe_3O_4$-containing scale was treated with an aqueous solution containing both formic acid and citric acid in a weight ratio of 2 citric:1 formic. The three series of runs illustrative of the practice of the invention, shown in FIGURE 3, comprised the following weight percents of the two acids based on the weight of the solution: 0.54 formic+0.27 citric, a total of 0.81 percent; 1.06 formic+0.53 citric, a total of 1.59 percent; and 1.6 formic+0.8 citric, a total of 2.4 percent.

FIGURE 4 shows graphically the percent by weight Fe dissolved by the aqueous acidic solvent from the $Fe_3O_4$-containing scale on the vertical axis and both the ratio of citric acid to formic acid by weight in the aqueous solvent and the total percent of both acids along the horizontal axis, the ratio values being set out at the bottom and the total percent at the top of the graph. The extreme left hand value represents no citric and all formic whereas the extreme right hand value represents all citric and no formic. The intermediate points show results of seven test runs employing aqueous solutions of both citric and formic acids wherein the weight ratio of citric acid/formic acid was varied from 1:6 to 6:1. The ratios of the two acids wherein no precipitation occurred are also shown on the graph of FIGURE 4.

An examination of the results shown on the graphs of FIGURES 1 and 2 of the drawing shows that precipitation occurred in all runs wherein an aqueous solution of either formic acid or citric acid (but not both acids) in 1, 2, or 3 percent concentrations were employed.

In contrast to the results shown on FIGURES 1 and 2, the graph of FIGURE 3 shows that aqueous solutions of mixtures of aqueous citric acid and formic acid, ranging from one containing a total weight percent of citric and formic acids of from 0.81 to 2.4 and composed of a ratio of formic acid to citric acid of 2:1 by weight produed no precipitate. FIGURE 4 shows that no precipitate occurred when the total weight percent of the two acids was varied between 0.78 percent and 1.0 and when the ratio of citric acid to formic acid was maintained between 6:1 and 1:3.

The invention is shown to possess important advantages over conventional scale-dissolving solvents. The effectiveness of the solution employed in percent compositions as low as 1 percent and less, is comparable to that of aqueous solutions of hydrochloric acid of considerably higher concentrations. It is less hazardous to employ and its corrosivity when uninhibited is definitely less than that of hydrochloric acid. When the temperature of the aqueous formic-citric acid solution employed in the invention is raised to above about 212° F., its corrosivity becomes insignificant and when raised to about 320° F. or higher, the acids therein are completely decomposed so that the necessity of draining the treated vessels is unnecessary. The particular advantage of the invention stems from the discovery that no sludge is formed to impede or stop the desired solubility action of the solution on the scale.

Having described my invention, what is claimed and desired to be protected by Letters Patent is:

1. The method of removing scale from the interior walls of a vessel consisting essentially of contacting said walls with a composition comprising an aqueous solution containing both citric acid and formic acid in a total amount of between 0.2 and 20.0 percent by weight of the solution, the ratio of the amount of the citric acid to that of the formic acid being between 1:3 and 6:1.

2. The method according to claim 1 wherein said aqueous solution while in contact with the scale is heated to a temperature of between 150° F. and the boiling point thereof for at least a portion of the time required to dissolve substantially all the scale contacted thereby and thereafter any scale-containing solution remaining in the vessel is raised to a temperature of at least 212° F. to lessen any corrosive tendencies of said solution.

3. The method according to claim 1 wherein said solution remaining in the vessel is heated to a temperature of at least 320° F. following the dissolution of the scale to decompose residual citric and formic acids remaining in said vessel.

4. The method according to claim 1, wherein the percent of total amount of citric acid and formic acid is between 0.5 and 3 percent by weight of said aqueous solution.

5. The method according to claim 1, wherein an inhibitor to the corrosive attack of acids on metal is contained in said aqueous solution in an amount between 0.1 and 1.0 percent by weight of said solution.

6. The method according to claim 1, wherein a wetting agent is admixed with said aqueous composition in an amount of between 0.01 and 0.1 percent thereof.

7. The method according to claim 6, wherein said wetting agent is a product formed by condensing di-secondary phenol and ethylene oxide in a molar ratio of about 1 of the di-secondary phenol to about 10 moles of the ethylene oxide.

References Cited in the file of this patent

UNITED STATES PATENTS

| 1,334,092 | Harmeling | Mar. 16, 1920 |
| 2,302,939 | De Long | Nov. 24, 1942 |

FOREIGN PATENTS

| 248,886 | Great Britain | Mar. 18, 1926 |